United States Patent

Kurrle

[15] 3,680,380
[45] Aug. 1, 1972

[54] ADJUSTABLE V-BELT ASSEMBLY

[72] Inventor: Charles R. Kurrle, R.D. 2, Box 15 MacPhail Rd., Baltimore, Md. 21014

[22] Filed: April 16, 1971

[21] Appl. No.: 134,710

[52] U.S. Cl. .................................. 74/234, 74/258
[51] Int. Cl. ........................... F16g 5/00, F16g 13/02
[58] Field of Search .................... 74/258, 234, 237

[56] References Cited

UNITED STATES PATENTS 3,233,922  2/1966  Evans ................... 74/424.6 UX
3,379,005  4/1968  Jones ........................... 74/258

*Primary Examiner*—Leonard H. Gerin
*Attorney*—John F. McClellan, Sr.

[57] ABSTRACT

An adjustable V-belt assembly comprising a cut-to-length piece of V-belting made of relatively flexible but non-elastic material and having a groove or other locating means in the outer surface, and a disconnectable adjustable length metal band disposed in the groove and securing the piece of V-belting in closed-loop configuration with the belting ends abutting; interlocking ends for the belting are also disclosed. By means of the cut belting and the disconnectable band, the belting can be applied to pulleys to be connected without any need for loosening or disassembling pulleys or pulley mounts, and exact fit is assured.

10 Claims, 6 Drawing Figures

PATENTED AUG 1 1972 3,680,380
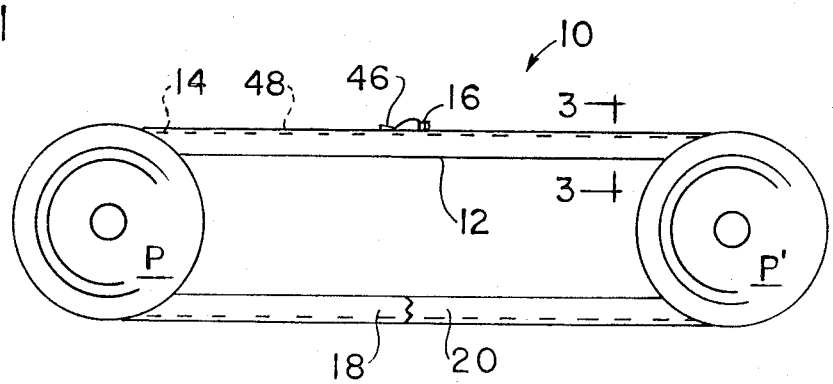
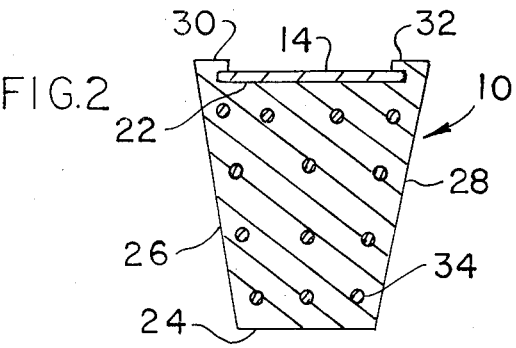
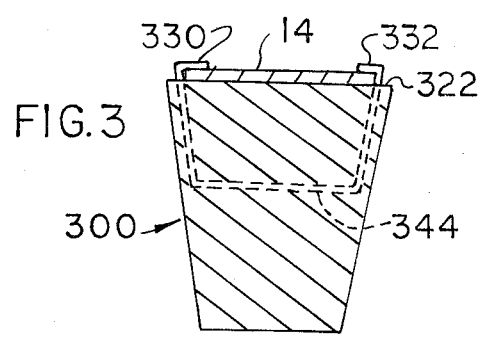
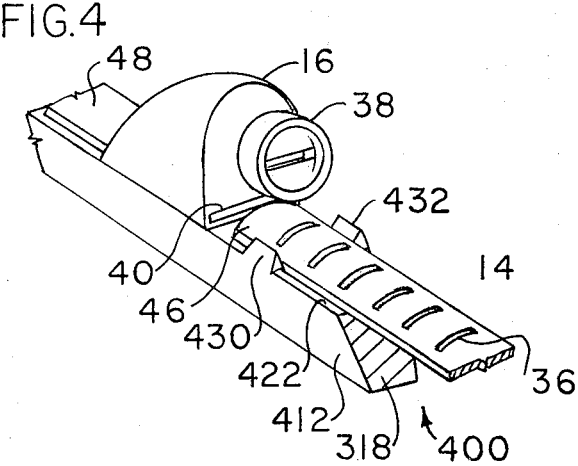
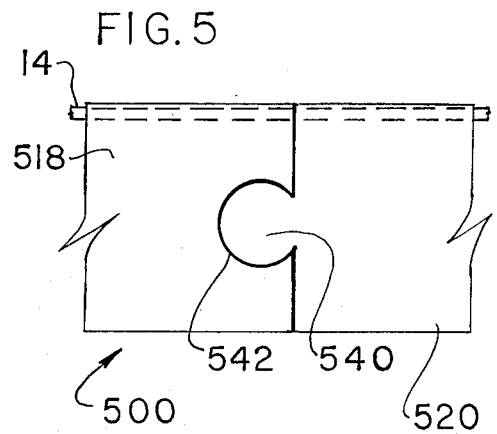
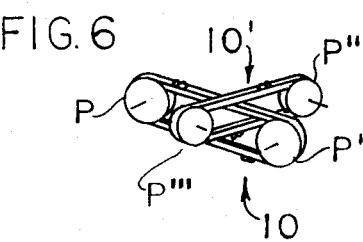
INVENTOR.
CHARLES R. KURRLE
BY
ATTORNEY

ADJUSTABLE V-BELT ASSEMBLY

This invention relates generally to power transmission and specifically to V-belts.

In many applications, V-belt replacement requires disassembly of pulley blocks, motor mounts, and the like with consequent loss of time and loss of adjustment of V-belt drive assemblies. Because belts stretch in service, it is sometimes necessary to replace entire matched sets of belts to preserve uniform tension when only one of the belts has become unserviceable.

Particularly in automotive applications, it is very costly for service stations and other repair facilities to maintain full stocks of the numerous sizes of V-belts which are demanded in day-to-day trade.

In automotive V-belt replacement also it is often difficult and dangerous to try to make quick repairs because of the need for forcing V-belts over pulleys adjacent to hot exhaust manifolds. And V-belts are sometimes scorched, scored, or frayed when installed under such circumstances.

It is therefore a primary object of the present invention to provide a V-belt which can be installed in almost all if not all applications not requiring an external idler, without disassembly or readjustment of the pulleys, regardless of the number or arrangement of belts required.

Another object of the invention is to provide a composite V-belt which can be threaded in place, cut to length, and adjustably secured, to form a perfect fit.

And another object of the invention is to provide a V-belt which can be rapidly installed inter-linked on crossing pulley systems, making possible new convenience in space saving arrangements in complex drive systems.

A further object of the invention is to provide an adjustable V-belt which is externally reinforced, flexible, durable, and economical to manufacture and to use.

In representative embodiment the V-belt of this invention comprises a belt of conventional V-belt shape in section except that the upper outer periphery forms a partially closed U-shape in section to receive and retain a metallic band around the outer periphery of the V-belt; the belt itself is parted intermediate the length of the belt and the parted ends are adapted, by shaping, to remain together; the steel band is length-adjustable, preferably by a screw-adjustment.

The above and other objects and advantages of this invention will become more readily understood on examination of the following description, including the drawings, in which:

FIG. 1 is a depiction of two pulleys mounting a V-belt assembly made according to this invention;

FIG. 2 is a sectional view of the FIG. 1 V-belt, taken at 3—3;

FIG. 3 is a view like that of FIG. 2 showing an alternative embodiment;

FIG. 4 is a detail of a metallic band adjustment;

FIG. 5 is a V-belt butt-joint detail; and

FIG. 6 is a detail showing a novel V-belt arrangement made easily feasible by this invention.

Turning now to FIGS. 1 and 2 in detail, FIG. 1 is a side view of a belt assembly 10 according to this invention, in place on a pair of pulleys P, P'.

FIG. 2 is a section of the belt assembly of FIG. 1.

A length of belting 12, cut sufficiently long to extend around the pulleys is held around them by a steel band 14. The steel band is made length-adjustable by means of a screw connector 16 which unites the ends 46, 48 of the band, by means of engaging threads in the free end which is passed through the connector which in turn is fastened to the other end of the band.

As best shown in FIG. 2, the belting is of the type having, in section, parallel-spaced outer surface 22 and inner surface 24, with inclined driving surfaces 26, 28 convergently inclined toward the inner surface 24. The outer surface has two outward protrusions 30, 32 at the sides, forming a groove between. The adjustable-length band is disposed in this groove, and is positioned by the protrusions.

As indicated in FIG. 2, the protrusions 30, 32 laterally overlap the sides of the band 14, securing the two together. This prevents the free ends 18, 20, FIG. 1, of the belting from becoming dislocated. A further locating provision for the free ends of the belting is shown in FIG. 1; they are cut in zig-zag fashion to intermesh, and are intermeshed when abutted in the assembly.

The material chosen for the belting is flexible but largely inelastic, so that the belting neither stretches nor compresses any substantial amount under load, but instead is constrained by the band and by the inelastic nature of the material to hold shape with the ends abutted. This result is attained by making the belting or rubber having steel wire inserts 34, FIG. 2, or by making the entire body of the belting of substantially inelastic material. If necessary to shorten the belt by sizeable amounts, end re-cutting is easy.

FIG. 3 is a sectional view like FIG. 2, but showing an alternative embodiment 300. Bendable lugs 330, 332 of soft iron or other material protrude from the sides of the top surface 322 of the belting. In the spacing between the lugs the band 14 is placed, and the lugs are then bent over the band, securing the bands and belting together. As can also be done with the overlapping groove of FIG. 2, this may be done before the ends are connected, so that the entire assembly can be installed as a unitary assembly, the band ends then being connected and the assembly tightened in place.

The lugs need not be heavy. They can be anchored by connection together, as at 344, within the body of the belting, or otherwise suitably anchored.

FIG. 4 details the connector 16, showing the free end 46 of the band 14 about to be introduced into the connector. Threads 36 formed in the band are engaged by threads of screw 38 when the free end of the band is introduced into slot 40, which passes through the connector. Excess band length is cut off. Material for the banding may be stainless steel or any other flexible but substantially inelastic or non-stretching material, including some types of plastic.

In the FIG. 4 embodiment 400, the belting has lugs 430, 432 provided at intervals along the outer surface 422 of the belting for lateral securance of the band. The lugs may, but do not necessarily, overlap the sides of the band. They are shown not overlapping the band. In this case, special interlocking provision for the ends of the belting may be employed to assure that the ends remain together in abutting relation.

In the FIG. 5 embodiment 500, the belting is shown with one such interlocking provision for the ends 518, 520. A simple plier-type die cutter or other suitable cutter is used to slice one end in the form of a square face having one or more undercut protrusions 540, and to make a complementary undercut recess 542 in the other end to receive the protrusion or protrusions.

FIG. 6 shows one of many novel pulley arrangements which are made feasible by this invention. In the Figure, belting assemblies 10 and 10' are interthreaded in a space saving manner not possible with ordinary V-belting.

Other advantages appear clearly from the novel V-belt assembly provided. Any required length of belting can be cut from a roll of belting and quickly installed, even in very inaccessible places. Adjustment requires only trimming, and tightening the band.

Plural bands can be connected in series, as indicated at 10 and 10' in FIG. 6. This feature together with the cut-to-length provisions for the belting, substantially reduces inventory requirements.

In summary, the invention makes is possible to reduce both inventories and installation time to a minimum, producing savings in both material cost and labor cost.

Obviously, many modifications and variations of the present invention are possible in light of the above teachings. It is, therefore, to be understood that within the scope of the appended claims the invention may be practiced otherwise than as specifically described.

What is claimed and desired to be secured by U. S. letters patent is:

1. An adjustable assembly for belting of the type having, in section, parallel-spaced outer and inner surfaces joined by a pair of driving surfaces convergently inclined toward the inner surface, wherein the assembly comprises a length of said belting formed of flexible, substantially inelastic material, a retainer integral with the outer surface of the belting, and an adjustable-length band laterally held by the retainer and securing the length of belting in a loop with the belting ends abutting.

2. An adjustable assembly for belting as recited in claim 1, wherein the abutting belting ends are shaped for intermeshing and are meshed.

3. An adjustable assembly for belting as recited in claim 2, wherein the retainer comprises at least one protrusive portion of the belting.

4. An adjustable assembly for belting as recited in claim 3, wherein the protrusive portion of the belting overlaps a portion of the adjustable length band.

5. An adjustable assembly for belting as recited in claim 4, wherein protrusive portions of the belting extend the length of the belting on either side of the outer surface, thereby forming an undercut groove adapted for continuously joining the belting and the adjustable-length band.

6. An adjustable assembly for belting as recited in claim 5, wherein the adjustable-length band is metallic.

7. An adjustable assembly for belting as recited in claim 6, wherein the adjustment means for the adjustable length band comprises a screw.

8. An adjustable assembly for belting as recited in claim 5, wherein the meshed ends of the belting are interlocked.

9. An adjustable assembly for belting as recited in claim 8, wherein the belting material comprises an elastic body reinforced internally to prevent longitudinal elastic deformation.

10. An adjustable assembly for belting as recited in claim 4, wherein the protrusive portion of the belting comprises a lug extending from the outer surface of the belting.

* * * * *